Figure 1:
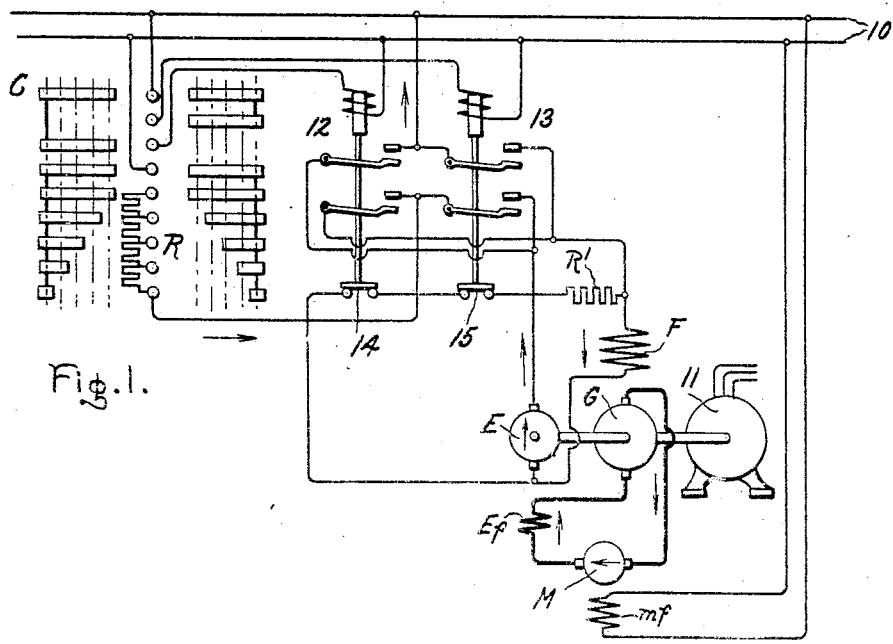

Inventor:
Max A. Whiting,
by *[signature]*
His Attorney,

June 18, 1929.    M. A. WHITING    1,717,823
CONTROL OF DYNAMO ELECTRIC MACHINES
Filed April 3, 1924    4 Sheets-Sheet 3

Inventor:
Max A. Whiting,
by *(signature)*
His Attorney.

Patented June 18, 1929.

1,717,823

UNITED STATES PATENT OFFICE.

MAX A. WHITING, OF SCHENECTADY, NEW YORK, ASSIGNOR TO GENERAL ELECTRIC COMPANY, A CORPORATION OF NEW YORK.

CONTROL OF DYNAMO-ELECTRIC MACHINES.

Application filed April 3, 1924. Serial No. 704,059.

My invention relates to improvements in systems of control for dynamo electric machines whereby the machine may be regulated accurately by a simple and effective arrangement.

Although the invention is not necessarily limited thereto, it has a particular application in systems of control for motors intended to operate elevators, hoists and the like. Arrangements have heretofore been provided for driving a high speed traction elevator by means of a direct current motor, the armature of which is supplied with current from a generator, the voltage of which may be regulated so as to regulate the speed of the motor. These arrangements are generally referred to as "generator voltage" control systems or "Ward Leonard" control systems. Arrangements of this sort are particularly applicable to the gearless type of elevators in which the rotating element of the driving motor is connected to operate directly the driving or traction sheave of the elevator. As the traction motor required for such a system is ordinarily of relatively small capacity and necessarily operates at a relatively low speed, the traction motor has ordinarily an inherently relatively high resistance armature circuit and as a consequence a relatively high percentage of armature IR drop at rated load. Unless this armature IR drop is compensated for, a drooping effect in the speed of the motor is experienced as the load comes on the motor. If the generator used is separately excited and is without a compounding winding and is not especially compensated in any other manner, its terminal voltage will decrease as the load comes on. If the motor which drives the generator has also a drooping speed characteristic, as is typical of the motors ordinarily used for this purpose, the droop in the speed of the motor will further increase the droop in generator voltage. As these effects (the traction motor armature IR drop, droop in generator voltage and droop in speed of motor driving the generator) are additive the speed of the traction motor tends to droop considerably under load. For similar reasons when the load overhauls the motor and the motor operates as a generator to effect the delivery of power to the main source of supply, the traction motor speed has an inherent tendency to rise considerably. Therefore, the regulation in speed of the traction motor between the maximum load as a motor, and the maximum regenerative load, is not as close as desirable for practical operation of high speed elevators.

Attempts to improve the speed regulation by means which produces the effect of a differential compounding of the traction motor, have been only partially successful as such differential compounding effect tends to be detrimental to the stability and torque of the motor during overloads. Efforts have also been made to improve the regulation of the system by compounding the generator in substantially the ordinary manner, that is to say, by employing a cumulative series field of the usual type on the generator in addition to the customary separately excited shunt field. This, however, has the disadvantage that if sufficient series field is used to provide a high degree of improvement in regulation at full speed of the traction motor, the effect is too great at comparatively low speeds. In other words, the series ampere turns necessary for a certain compounding of the generator at full voltage and normal saturation are excessive when acting at low generator voltage and, therefore, upon an unsaturated field structure. A further disadvantage is that a heavy momentary regenerative current set up while the traction motor is retarding quickly to rest or to a low speed may cause the series field winding of the generator to overpower the shunt field winding sufficiently to cause a violently rapid retardation and in some cases to set up severe oscillations in generator voltage.

It is known to those skilled in the art that, in principle, generators can be compounded by shifting the brushes backward, that is to say in the direction opposite to the rotation, and furthermore that such an adjustment is perfectly feasible under some conditions of general application. However, in connection with "generator voltage" or "Ward Leonard" control, this method of compounding is open to the same objection as is the method of compounding by means of a series field of the usual type.

One of the objects of my invention is to provide for the generator used for voltage control of a direct current motor, an ample cumulative compounding effect at full voltage and obtain thereby a good speed regulation of the motor at full speed without encountering the difficulties at low generator voltage which are inherent in the obvious methods of compounding as indicated in the foregoing.

A further object of the invention is to provide an ample but not excessive cumulative compounding effect at low voltages as well as at full voltage in order to improve the motor speed regulation at all voltages and at the same time avoid the difficulties indicated.

A further object of the invention is to attain the foregoing objects without resorting to a "step-by-step" method and without necessitating the use of a plurality of relays or similar devices with a complicated system of interconnections.

In carrying the invention into effect in the form which I now regard as the preferred form, an auxiliary exciter is provided for supplying to the generator the proper cumulative excitation. This auxiliary exciter is constructed and arranged so as to become saturated independently of the generator so that the effect of this auxiliary machine can be limited as to its maximum and in general proportioned independently of the generator saturation throughout the range of operation of the auxiliary machine. The auxiliary exciter is connected in circuit with the separately excited generator field in such a manner that the generator field controller is able, on its various speed positions, to modulate the compounding or regulating effect of the exciter.

A further object of the invention is to construct the exciter and connect the same in the separately excited field circuit of the generator in such a manner that a component of the separate excitation of the generator will vary substantially directly with variations of the armature current of the motor up to a predetermined maximum value, after which this component will then become substantially constant for further increases of the said armature current.

A still further object of the invention is to provide an arrangement whereby the voltage of the generator and therefore the speed of the motor may be predetermined and whereby the proportionate effect of the exciter in determining the voltage of the generator under load may be very nicely regulated so that the traction motor shall have the desired speed regulation.

Another object of the invention is to provide an arrangement whereby the exciter shall have a proportionately greater effect in determining the voltage of the generator under load when the excitation of the generator separately excited field is initially adjusted so as to effect a comparatively low speed of the traction motor.

Another object of the invention is to prevent instability of the speed of the traction motor when it is attempted to vary the motor speed quickly.

A still further object of the invention is to provide an arrangement whereby when it is attempted to reduce the excitation of the generator quickly so as to thereby reduce the motor speed quickly, the excitation of the generator field is momentarily regulated in accordance with the rate of change of an operating condition of the equipment, such for example as the rate of change of the motor speed, the rate of change of the field flux or some other electrical characteristic of the generator, the rate of change of the current exchanged between the generator and the traction motor, or any other suitable changing condition, so as to thereby prevent the exciter from reversing the direction of current through the generator field to such an extent that effects are experienced which are detrimental to the smooth operation of the elevator or other appliance.

An object of the provision of an arrangement as indicated, is to permit the employment of an arrangement whereby the exciter may have a comparatively very great effect in regulating the excitation of the generator field, and to prevent the excessive momentary departure of the traction motor speed-time characteristic from a suitable speed-time characteristic when it is attempted to reduce the speed of the traction motor quickly.

These and other objects of the invention as will be either pointed out particularly hereafter, or as will be apparent to those skilled in the art from an understanding of the invention, are attained in the embodiments of the invention which are described in more detail hereinafter.

Although the invention has a general application to the control of dynamo electric machines and in particular to the improvement of the characteristics of generator voltage control systems, in order that an understanding of the invention may be readily had, I have illustrated the same and shall describe the invention in connection with a control system applied particularly to a traction elevator, hoist or the like.

Figure 2:
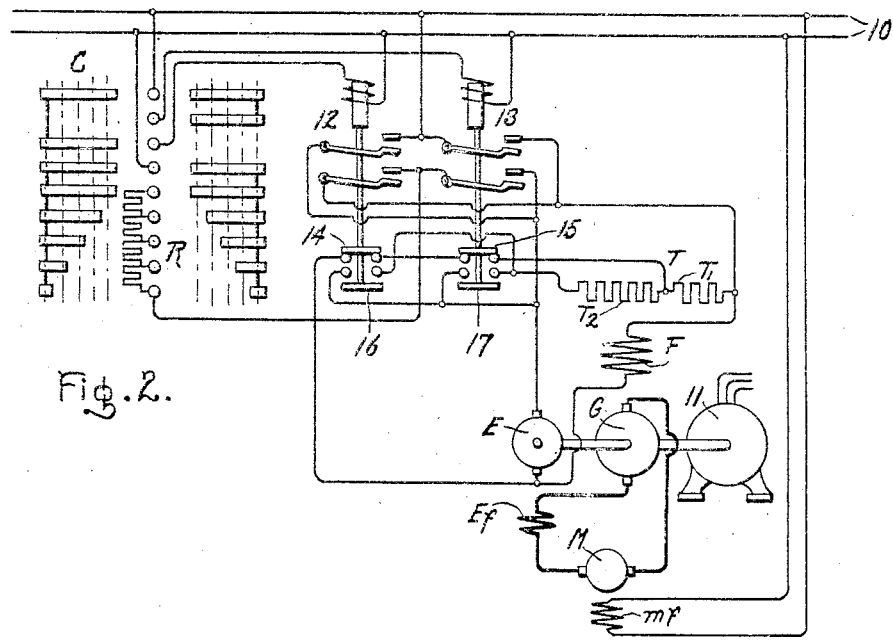
Figure 3:
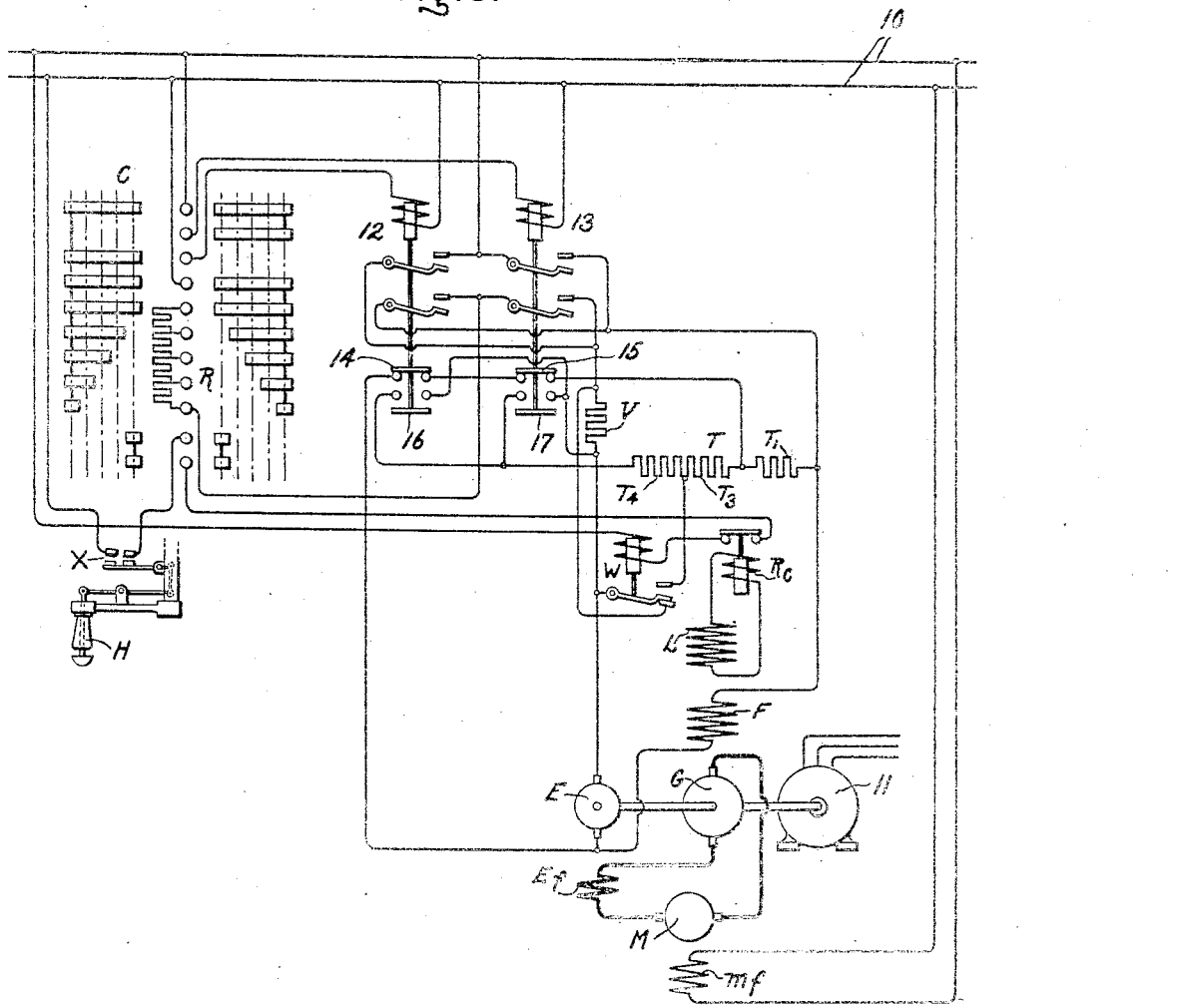
Figure 4:
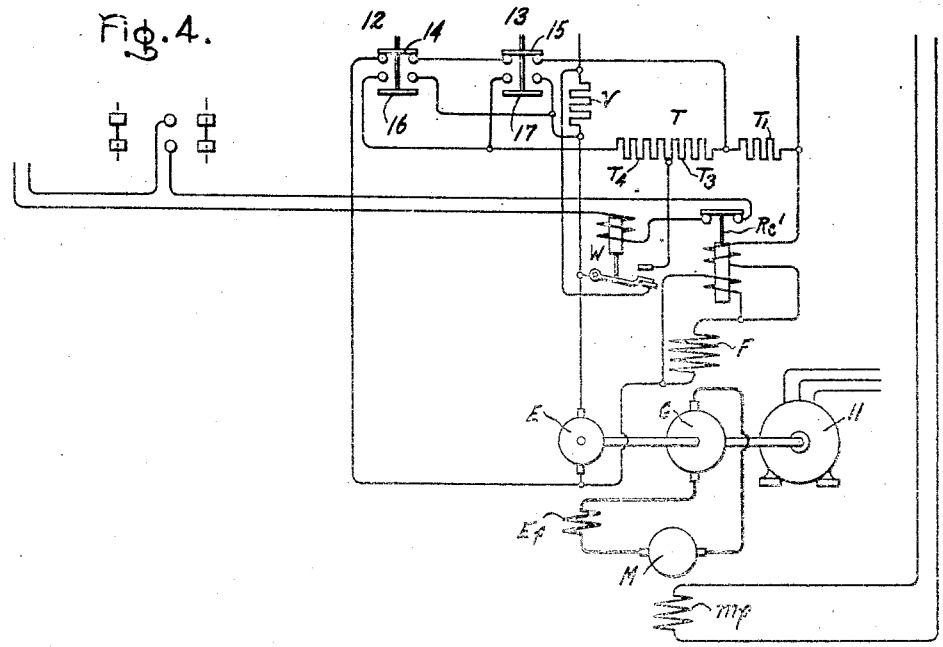
Figure 5:
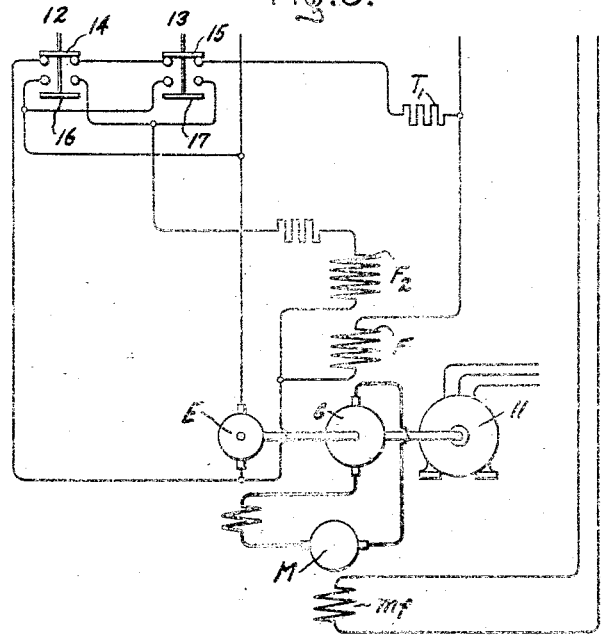
Figure 6:
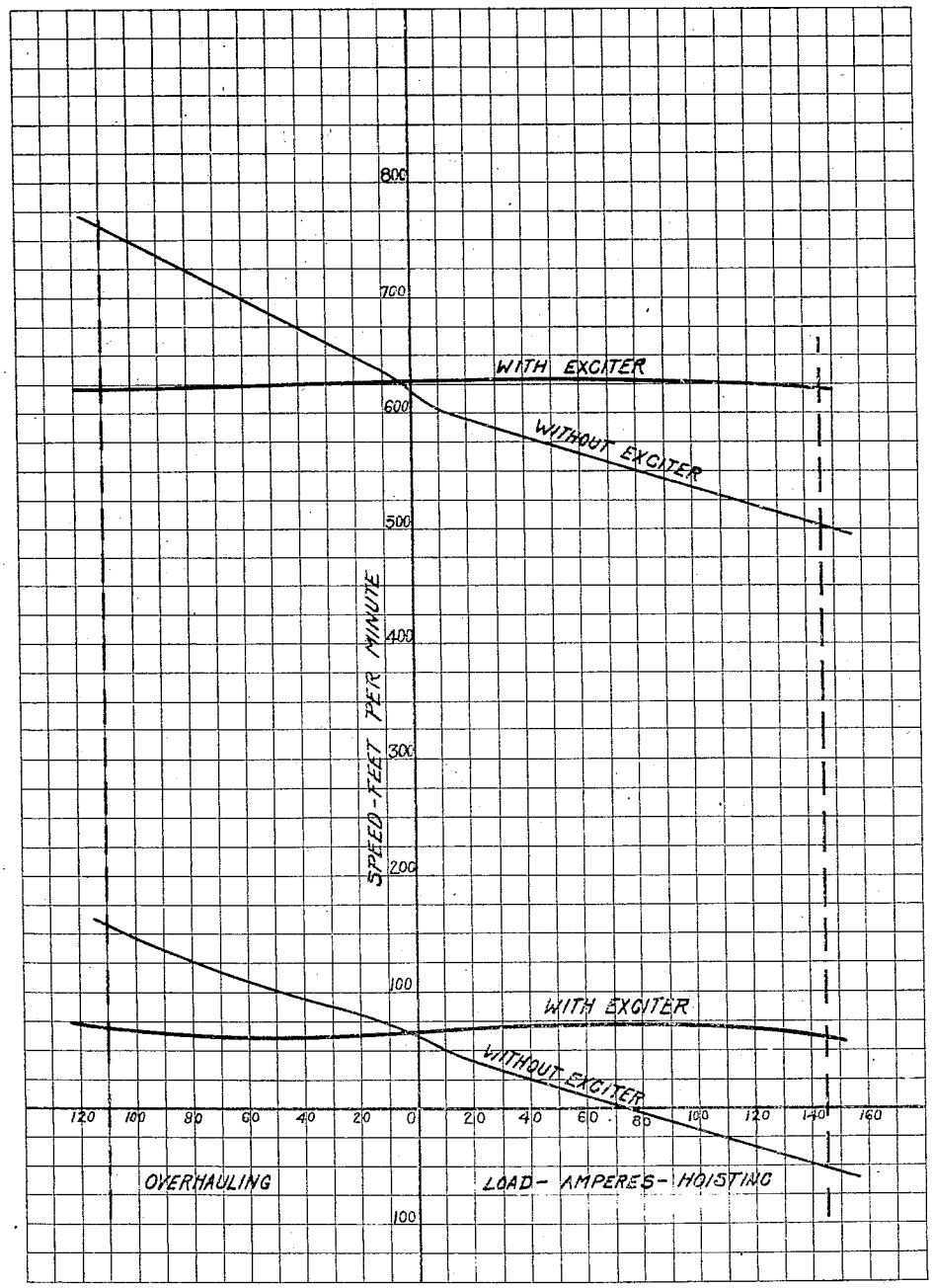

Referring to the accompanying drawings, wherein the invention is so illustrated, Fig. 1 is a very simplified diagram of a system of generator voltage control embodying the invention; Fig. 2 is a similar very simplified control system in which specific provision is made for insuring that the exciter for the separately excited generator field shall have a proportionately large effect in determining the voltage of the generator when the excitation of the generator is adjusted so as to obtain a comparatively low speed of the traction motor; Fig. 3 is a similar system of control embodying the general features of the arrangement of Fig. 2 and having further the provision of means whereby the control of the excitation of the generator is responsive to the rate of change of an operating condition (in the arrangement illustrated, in accordance with the rate of change of the field flux of the generator); Fig. 4 is a detail of an alternative arrangement for accomplishing in general the same objects as the arrangement of Fig. 3; Fig. 5 is another detail of an arrangement for a purpose similar to that of the arrangement of Fig. 2 and in which an additional field winding for the generator is provided, this additional field winding being energized directly from the exciter, and Fig. 6 represents characteristic speed-load curves which may be obtained with equipments operating in accordance with the invention.

It will be observed that the control systems of Figs. 1 to 5 inclusive have been shown in very simplified diagram and that certain parts such as solenoid brakes, limit switches and other auxiliary apparatus which would be necessary in a practical application of the invention to the control of an elevator, have not been shown since it is believed that those skilled in the art will readily understand the application of such auxiliary devices in the systems of the invention. It is believed that the invention will be more readily understood with the description of those auxiliary parts omitted, although I would have it understood that I contemplate that when the invention is used in the control of an elevator or the like, such auxiliary devices will be supplied as the conditions to be met require.

Referring to Fig. 1, it will be seen that I have therein illustrated in very simple diagrammatic form, a reversing control equipment for the motor M which I shall term the traction motor. The armature of this motor is connected to receive operating current from the armature of the generator G and the motor field winding $mf$ is connected to the substantially constant potential source of supply 10 which serves as an excitation bus. The generator G is arranged to be driven by the motor 11 which is shown as of the three phase alternating current type intended to be connected to a suitable source of current supply. The exciter E is shown as mounted on the same shaft as the armature of the generator G so as to be driven by the alternating current motor 11, although it will be understood that it is not necessary for the armature of this exciter to be mounted on the same shaft as the armature of the generator G, it being merely sufficient that the exciter be driven at a substantially constant speed by any suitable means.

The generator is provided with field winding F which is arranged to be separately excited from the excitation bus 10. The connections are such that the armature of the exciter E is in series relation with the separately excited field F in a circuit controlled by the electromagnetic reversing switch mechanism comprising the contactors 12 and 13 which are operated under the control of the reversing and speed varying controller C. The exciter E has a field winding $Ef$ which, as shown, is connected in the circuit including the armature of the motor M and generator G, so that the exciter E shall have an excitation which varies between predetermined limits in accordance with the variations in the current delivered to the motor M and the current supplied by this motor when operating regeneratively.

The magnetic structure and the windings of the exciter are so constructed and arranged that the voltage generated by the exciter varies substantially in accordance with the current in the local circuit, which includes the generator and motor armatures, up to a predetermined value and then the magnetic structure becomes substantially saturated so that further increases of the current in the said local circuit will produce comparatively little further increase of the voltage generated by the exciter. The exciter thus furnishes a component of the excitation of the generator and this component varies between limits in accordance with the current taken by the motor. In general, it may be said that the object of this provision is that the generator excitation shall be of cumulative character so as to compensate for the dropping speed characteristic heretofore referred to, and that for all ordinary loads imposed on the motor M the compensation for the inherent drooping speed characteristic shall be in accordance with the load current of the motor M, but that for loads on the motor M in excess of a predetermined normal value the speed characteristic shall droop, so as to obtain thereby a safe and stable operative condition during overloads. Furthermore, in general it may be said that by reason of the fact that the exciter is constructed and arranged so as to become substantially saturated at the predetermined value of load on the motor M, a greater freedom of design for the generator is possible. In other words, instead of attempting to secure the compensation for the drooping speed characteristic of the traction motor by special and difficult design of the generator or the traction motor the compensation is effected by the proportioning of the exciter which may be a dynamo electric machine of a very small capacity as compared to the generator.

I have stated that the exciter is preferably designed so that its generated voltage varies substantially in accordance with the load current of the generator up to a predetermined load, beyond which load further increases of generator current will produce comparatively little further increase of the voltage generated by the exciter. Methods in accordance with which this may be accomplished are known to those who are skilled in the design of dynamo-electric machinery, particularly exciters. However, in order to assist others in an easy understanding of the invention and the manner in which it can be carried into effect, I shall outline a method which may be employed:—

In general, the magnetic circuit of the exciter is so proportioned throughout that for all generator loads up to the desired saturating point of the exciter nearly all the magnetic reluctance is in the air gap and furthermore so that no part of the iron has closely approached complete saturation. By "iron" I mean the permeable material of the magnetic circuit, be it iron in the strict sense of the term, or steel or other material. A limited length of the iron is given a uniform restriction in cross-section so that as the exciting current is increased to approximately the normal load of the generator, this restricted section will begin to be saturated first. At further increases of excitation the reluctance of this restricted section will increase very rapidly, and will become a large proportion of the total reluctance. Thus the further increases of flux will be relatively small per unit increase of excitation, and the voltage generated by the exciter at overload excitations will accordingly not increase greatly over its value at normal load excitation.

The foregoing principle is illustrated by an example herewith in which values are tabulated pertaining to a magnetic circuit of simple character, the respective elements of which are intended to represent, substantially effects proportional to all the significant effects of the elements in an actual exciter designed to embody the desired characteristics.

The iron used in the example is assumed to be a typical grade of sheet steel of high permeability and the reluctance values in the tabulated illustration hereinafter have been taken from data representing substantially the characteristics of a typical lot of said grade of steel, but the success of this method of proportioning the exciter is not dependent upon the exact magnetic characteristics of the iron used.

The air gap selected is assumed to have an effective cross-section of 3.0 square inches and a total length (both gaps in series) of 0.10 inch. The restricted section of iron is assumed to have a uniform cross-section of 1.0 inch and a total length of 3.0 inches. The other parts of the iron are assumed to be less saturated than the restricted section, and their integrated effect is assumed to be represented closely enough for the purpose by a cross-section of 1.5 square inches and a length of 10 inches. The characteristics of the entire magnetic circuit will then be approximately as follows:

| | | | | | |
|---|---|---|---|---|---|
| Total flux "lines" | 30,000 | 60,000 | 90,000 | 120,000 | 135,000 |
| Air-gap density,"lines"/sq. in. | 10,000 | 20,000 | 30,000 | 40,000 | 45,000 |
| Restricted section density "lines"/sq. in. | 30,000 | 60,000 | 90,000 | 120,000 | 135,000 |
| Unrestricted section density "lines"/sq. in. | 20,000 | 40,000 | 60,000 | 80,000 | 90,000 |

*Ampere-turns required.*

| | | | | | |
|---|---|---|---|---|---|
| For air-gap | 313 | 626 | 939 | 1,252 | 1,408 |
| For restricted section | 6 | 12 | 46 | 1,005 | 6,000 |
| For unrestricted section | 17 | 25 | 40 | 83 | 153 |
| Total ampere-turns required | 336 | 663 | 1,025 | 2,340 | 7,561 |

In this example no account has been taken of leakage, the effect of which will tend to modify somewhat the values of total ampere terms required for producing the values of flux as stated. However, the existence of a moderate amount of leakage does not change the principle involved, and in an actual embodiment the effect of the leakage can be reduced, by skillful design, to nearly a negligible value.

It will be observed in the example that the flux is almost exactly proportional to the total ampere turns up to the value of 90,000 "lines" at 1025 ampere-turns, and that beyond 90,000 "lines" the flux increases at a very much lower rate per unit increment of ampere-turns. This value of 90,000 "lines" at 1025 ampere-turns corresponds, therefore, to a suitable operating condition of the exciter at the maximum generator load at which it is desired to maintain close regulation of the traction motor. It will be understood that by retaining the same lengths of the various elements of the magnetic path, but by increasing or decreasing the cross-sections, the various cross-sections being changed in the same proportion, a greater or less flux may be employed which will then possess a characteristic proportional to that of the illustration.

By calculating similar simplified examples in which the proportions of the respective elements of the magnetic circuit are varied, those skilled in the design of exciters will readily obtain a still more complete and detailed understanding of the method.

I do not represent that it is necessary to adhere closely to the proportions illustrated in order to benefit by the application of the principles set forth herewith, nor do I represent that the proportions illustrated are necessarily the best that can be found for the purpose. I would have it understood, furthermore, that the successful working of my invention, for example as embodied in Fig. 2, for the attainment of results equally as suitable as those shown in Fig. 6, is not dependent upon a high degree of improvement of exciter design in accordance with the principles explained herein, but I regard the said improvements in exciter design as beneficial in some cases for the attainment of further refinements in the speed regulating characteristics of the traction motor over those shown in Fig. 6.

The exciter E is preferably designed so that at normal load on the main motor M, the exciter will generate a voltage which is a predetermined percentage of the value of the voltage of the excitation bus 10. I have found that good operating results are obtained when the exciter generates a voltage of approximately 35 to 40% of the voltage of the excitation bus 10, although I would have it understood that my invention is not limited to this selection of values, since these values will vary depending upon the characteristics of the generator, traction motor and the duty to which they are applied. The exciter should preferably be designed so that for moderate overloads of the motor M the exciter magnetic structure shall become thoroughly saturated and the exciter shall generate only a slightly higher voltage under these conditions.

Referring to Fig. 1, the resistor R is provided for regulating the maximum no-load voltage of the generator G so as to predetermine the maximum no-load traction motor speed, and this resistor may be adjusted for any suitable value under the control of the controller C, as will be understood by those skilled in the art. The resistor $R^1$ is provided for shunting the generator field F when the controller C is in the off position, so as to thereby form a discharge path for the generator field to deenergize this field at a rate which is not excessively high when the controller is thrown to the off position. The resistor $R^1$ is connected in a circuit which includes the auxiliary switches 14 and 15 of the reversing contactors 12 and 13 respectively and these auxiliary switches are normally in their respective closed positions; that is, when the reversing contactors 12 and 13 are deenergized and open, the discharge path including the resistor $R^1$ is established about the generator field. In case either one of the reversing contactors is energized to close, its corresponding auxiliary switch will be opened so as to thereby open the discharge path. The generator field discharge path excludes the armature of the exciter so that the decrease of the generator field flux is not influenced by the voltage of the exciter when the controller is in the off position. It will be observed that the reversing contactors 12 and 13 control the circuit which includes the exciter armature and the generator field so that when the controller C is in the off position and the reversing contactors 12 and 13 are deenergized and open, the exciter armature and generator field are completely disconnected from the excitation bus 10. By thus connecting the exciter armature in a circuit within the reversing switch mechanism, the polarity of the exciter is caused to be correct for all of the various conditions which must be met; that is, when the motor M is rotating clockwise as a motor, when the motor M is rotating clockwise regenerating, when the motor M is rotating counterclockwise as a motor and when the motor M is rotating counterclockwise regenerating.

That the polarity of the exciter E is thus correct for all cases is shown by the following:

Consider that the controller C has been thrown to one of its operative positions toward the right, i. e., with the lefthand group of segments in contact, thereby energizing the reversing contactor 12 to connect the excitation bus 10 through a circuit from the lower conductor of bus 10, through the portion of the adjustable resistor R as determined by the position of the controller C, through the lower main contact of contactor 12, generator field F, exciter armature E, upper main contacts of contactor 12 to the upper conductor of 10. The excitation of generator G thus provided will be assumed to be in the direction which causes the motor M to rotate in the clockwise direction. Let it be assumed that motor M is loaded as a motor, and that under these conditions the directions of the currents in the various circuits are represented by the arrows. Exciter E must be so connected that its voltage is in the direction of the arrow, i. e., so that E boosts the current through F.

Now consider controller C thrown to an opposite operative position, i. e., with the right-hand group of segments in contact, so that the reversing contactor 12 is de-energized and opened and the reversing contactor 13 is closed. The direction of the generator field current in F will now be opposite to the arrow. Assume that motor M, now rotating counterclockwise, is again loaded as a motor. The direction of the current in the armature circuit of G and M will be opposite to the arrow so that the current in exciter field $Ef$ will also be opposite to the arrow. Thus the voltage generated by exciter E will be opposite to the arrow i. e., exciter E is again boosting the generator field current in F, the same as was the case when the motor M was rotating in the clockwise direction. It is clear that for a constant direction of rotation of motor M and correspondingly a constant direction of excitation of the generator field F, if the exciter E is permanently connected so as to boost the current in the field F when the motor M is loaded as a motor, the exciter will buck the field current of the generator when the motor M is loaded regeneratively. The field $mf$ of motor M is not affected by the exciter E because of the fact that this field may be permanently connected directly to the excitation bus 10.

It will thus be seen that at any one of the definite operating positions of the controller C at which a value of the resistor R, as determined by the position of the controller, is included in the field circuit of the generator, in case the load increases on the motor M, operating as a motor, the excitation of the generator will be increased by reason of the fact that the excitation of the exciter is increased correspondingly, so that the voltage generated by the generator is increased correspondingly to compensate for the IR drop of the motor M and the other characteristics which tend to cause poor speed regulation. The component of the excitation of the generator which is furnished by the exciter thus regulates the voltage of the generator and the speed of the traction motor. A substantially improved speed regulation of motor M is thus automatically maintained and if machines having advantageous characteristic curves are selected, the speed of motor M may be maintained substantially constant, as will be observed from an inspection of Fig. 6. Likewise when the motor M operates as a generator returning power to the source of supply to which the alternating current motor 11 is connected, such regenerative load of the motor M will decrease the voltage generated by the generator G, thereby operating to prevent a substantial rise in speed of the motor M. The substantial improvement in speed regulation of the traction motor is therefore effective whether the traction motor operates as a motor or operates as a regenerative machine.

Those skilled in the art will understand from this disclosure that the desired adjustment of the full speed characteristic may be obtained by the design of the exciter for the proper voltage at a given load. I find it convenient to select, in a given case, an exciter whose armature winding will generate a voltage slightly greater than the anticipated requirements. If, in the completed equipment, the value of exciter voltage thus selected actually proves excessive, its excess of regulating effect can be counteracted conveniently by a forward shift of the generator brushes which will have a demagnetizing effect upon the generator. A margin of adjustment is thus secured which may be found helpful in obtaining the desired characteristics.

When the controller C is thrown from an operative position to the off position (that indicated in the drawing) the reversing contactors 12 and 13 are both in their respective open positions and the generator field is connected in a discharge path which includes the resistor $R^1$ and the auxiliary switches or contacts 15 and 14 of the reversing contactors. As previously pointed out, it will be observed that the armature of the exciter is not included in this discharge path so that the exciter can neither reverse nor sustain the generator field after the controller is returned to the off position.

As previously set forth, the magnetic structure and the windings of the exciter E may be proportioned so that the exciter will generate a voltage which will boost the generator field sufficiently to cause the full load speed of motor M to be equal to the no load speed, thus maintaining a practically constant speed of motor M for all ordinary loads encountered. However, when the exciter E is so proportioned the system of connections as used in Fig. 1 will prevent the exciter E from causing a violent reversal of generator voltage when the motor M is retarded rapidly by rapid manipulation of the controller, such as would be the case under like circumstances if an ordinary cumulative series field on the generator were used and adjusted for an equal compounding effect. The reason for this is that the exciter is preferably designed to generate, when completely saturated, a much lower voltage than the excitation bus voltage 10. It will be remembered that a satisfactory maximum voltage for the exciter E was found to be approximately 35 to 40% of the voltage of the excitation bus. Thus, no matter how high the regenerative load current may be during a retardation, exciter E cannot reverse the current in the generator field F against the direction of current through the generator field as determined by the excitation bus 10 and as determined by the closing of the selected one of the direction contactors 12 and 13.

It has been shown that a series field of the usual type on the generator, when strong enough for a high degree of improvement in regulation at full speed of the traction motor, will be excessively strong at low speeds. The system of connections shown in Fig. 1 prevents the exciter E from exerting an excessive effect when the motor M is running at reduced speeds. The reason for this is that when the controller C is on any reduced speed position, the effect of exciter E is reduced by the same resistor which reduces the effect of excitation bus 10. This may be understood more clearly from the following illustration in which specific values have been selected merely for the purpose of making clear the general principle involved:—Let it be assumed that at full speed, and at normal value of load of motor M the exciter E will generate 90 volts and that the voltage of the excitation bus 10 is maintained substantially constant at 240 volts. Under these conditions, the generator field current will be boosted in the ratio of $$\frac{240 + 90}{240}$$

i. e., will be boosted to 137½% of its original or no-load value and in a typical case we will assume that this will effect an increase of the current in the generator field from 3.0 amps. at no load to 4.12 amps. at rated or normal full load. Let it be assumed that this increase in the excitation of the generator field is sufficient to increase the total generator voltage (terminal voltage plus generator armature circuit IR drop plus generator brush drop) by approximately 30 volts (from 210 volts to 240 volts). In the ordinary case this will be sufficient to maintain a reasonably uniform speed of motor M over this range of load.

Let it now be assumed that the controller C is adjusted so as to include all of the resistor R in the generator field circuit (first position of the controller) in order that the no-load speed of the motor M may be comparatively very low, and let it be assumed that the total resistance of the circuit, including the resistor R and the generator field circuit is 960 ohms. The voltage of the excitation bus 10 being substantially constant at 240 volts, under these conditions the generator field current will be 0.25 amp. at no load. The exciter E, as before, will generate at normal full load approximately 90 volts, and with this adjustment the generator field current will be $$\frac{240 \text{ volts} + 90 \text{ volts}}{960 \text{ ohms}}$$

or 0.345 amp. At 0.25 amp. excitation the generator G will generate in a typical case a total of about 24 volts and at 0.345 amp. excitation about 30 volts, a rise of only 6 volts. The IR drop of motor M at rated load current is the same regardless of speed, so that if a rise of 30 volts was required before for flat regulation of the speed of motor M, a rise of only 6 volts in total generator voltage at the assumed low speed condition will allow the motor speed to droop very appreciably with the load. This is the opposite effect from that previously explained as pertaining to a heavy compounding by a directly applied generator series field. It is not an object of the invention to provide an arrangement whereby there is accomplished so low a compounding effect of generator G at low voltages as to give motor M a characteristically drooping speed regulation at low speeds. A principal object is rather to make sure that the heavy compounding desired and provided in order to obtain good speed regulation at the higher speed positions of the controller C shall not have an excessive effect when the controller is in such a position as to effect a comparatively low speed of the traction motor. It is merely an incidental result of the arrangement of Fig. 1 that the generator G is compounded so little at low speeds of the traction motor that the improvement of traction motor speed regulation is less than desired. However, I would have it understood that in Fig. 1 the exciter does exert a beneficial effect at reduced generator voltage and reduced speed of the traction motor and that the regulation of the motor M is more nearly uniform at low speeds than would be the case for a generator not provided with any compounding effect.

It has been explained heretofore how the employment of an equal compounding effect, in ampere turns, at normal saturation of the generator and at the lowest no-load excitation of the generator provides, in general, an excessive effect at the low excitation. It has been shown also how the employment of only a proportionate compounding effect at normal saturation of the generator and at the lowest no-load excitation of the generator does not provide sufficient compounding excitation at the lowest no-load excitation for the most preferred degree of regulation. What is wanted, therefore, is such a modulation of the compounding that when the controller is shifted from the full-speed to the lowest speed position, the compounding will become absolutely less but proportionately greater.

In order to retain the advantages of the embodiment of the invention as shown in Fig. 1 and also to make a substantial improvement of the regulation at low speeds, I have devised the arrangement as shown in Fig. 2 wherein provision is made whereby the effect of exciter E, although still limited, is increased at low speeds over that of Fig. 1.

I have shown that in the first form of this invention the maximum effect produced by the auxiliary exciter upon the field current of the generator is dependent upon the relative magnitude of the exciter voltage and the main exciting voltage from bus 10. For example, if in Fig. 1, on the lowest speed position of the controller and under a set of conditions otherwise the same as before, the voltage impressed upon the generator field circuit by bus 10 be reduced to, for example, 120 volts instead of 240 volts as previously, and resistor R be readjusted to maintain the same no-load field current in F as before, the effect of exciter E under this condition will be twice as great as before.

The voltage impressed upon the generator field circuit by excitation bus 10 can, in effect, be thus reduced at low speed positions of the controller by the use of a resistor in series and a resistor in multiple with field F; that is to say, by employing a potentiometer arrangement to which the field F and exciter E are connected.

Accordingly, I have devised the arrangement shown in Fig. 2. Parts having the same function in Figs. 1 and 2 respectively are lettered alike. In Fig. 2 the resistor T has been provided and a part ($T^1$) of this resistor performs the function of a discharge resistor such as resistor $R^1$ in Fig. 1. Resistor R will be of the same character as in the first form, but its numerical values on the various steps will typically be somewhat different in a specific case because the IR drop in resistor R is now determined in part by the current flowing in the branch circuit comprising resistor T.

At the full speed position of the controller, with all of resistor R short-circuited, resistor T is connected directly across excitation bus 10. Under this condition, therefore, resistor T does not exert any effect on the regulation of exciter E and generator field F. The speed regulation at the full-speed position of the controller is therefore not affected by resistor T but is of exactly the same character, and may have identical adjustments as in Fig. 1.

Now consider the controller closed on the lowest speed position, as for example, on the first operative position in which the contactor 12 is closed. The auxiliary switch 14 will be open, the auxiliary switch 16 will be closed, the entire resistor T is in circuit and the entire resistor R is in circuit. There are now two paths, partly coinciding and partly distinct, by which exciter E can affect generator field F. The first of these two paths or circuits is from the lower conductor of excitation bus 10 through controller C and resistor R, through the lower main contact of contactor 12, through F, through E, through the upper main contact of contactor 12 to the upper conductor of bus 10. Through this circuit exciter E can exert a small effect upon generator field F, the effect being limited by resistor R. This first circuit, and its effect, correspond to those of Fig. 1. The second circuit is a local circuit through E, F, resistor T (comprising $T^1$ and $T^2$) and back to E; through this second circuit exciter E can apply an additional component of excitation to field F. The less the resistance of resistor T the greater is this second component of excitation which E can apply to F. In one limiting case, in which resistor T is reduced to zero, the current in generator field F will be determined solely by exciter E, and will therefore vary solely in accordance with the load current. In the other limiting case, in which resistor T is infinitely high, i. e., resistor T is absent, the characteristic reverts to that of Fig. 1.

It is evident, therefore, that when the controller is on the lowest speed position as described, the proportionate effect of exciter E may be increased to a high degree by reducing the value of resistor T, and conversely may be reduced by increasing the value of resistor T.

By selecting proper values of resistors R and T in relation to the resistance of generator field F, the no-load speed on the first point can be selected and the degree of compounding on the first point, and thereby the speed regulation can be adjusted.

On any intermediate speed controller position, i. e., with only part of resistor R in circuit, but with resistor T in circuit as before, the operating characteristics are similar to those just described for the first speed position. Exciter E therefore exerts upon generator field F a proportionately greater effect than at the full speed position. If desirable or important, those skilled in the art will readily introduce arrangements whereby, on each intermediate speed position, resistor T would be given the value which would provide just the degree of compounding desired upon that speed position. I have found, however, that when the componding characteristics on the first and last speed positions are adjusted to give the most suitable speed characteristics respectively for these positions, the speed characteristics on the intermediate controller positions are ordinarily suitable.

It is advisable in all cases to provide, in one form or another, some means for suitably discharging the flux of generator field F, to be effective whenever the exciting circuit to F is opened. In Fig. 1, discharge resistor $R^1$ is shown, effective when both contacts 14 and 15 are closed, which occurs only when the main contacts of contactors 12 and 13 are all open.

In Fig. 2, if contacts 14, 15, 16 and 17 were not used, resistor T would serve as a discharge path for field F. However, there are two reasons why this may not be a desirable arrangement for obtaining a discharge path; (1) resistor T, adjusted for the desired speed regulation on the first-speed position will usually be higher than is most suitable for a discharge resistor; (2) the continuance of exciter E in circuit with field F at the off position would energize generator field F and tend to keep motor M in motion. For these reasons, a somewhat different arrangement of discharge circuit is used. Conveniently, contacts 14 and 15 may be used in Fig. 2 as shown, whereby part $T^1$ of resistor T is utilized as a discharge resistor for field F. Contacts 16 and 17 are not strictly necessary, and in fact may be omitted in some equipments in which the system of Fig. 2 is used; in such case, the resistance of $T^2$ is high enough so that exciter E is not overloaded when thus connected directly across $T^2$ at the off position. However, the use of contacts 16 and 17 as shown whereby the circuit to the armature of exciter E is opened at the off position makes it practicable to use any part or all of resistor T as the discharge resistor $T^1$. Furthermore, in case contacts 14 and 15 fail to make good contact, the use of contacts 16 and 17 prevent exciter E from exciting field F at the off position. In case, however, the foregoing method of establishing a discharge circuit is not desired, other arrangements may be made, as will be understood by those skilled in the art from a consideration of the foregoing.

By the application of the means shown in Fig. 2, I have obtained improvements in speed regulation as shown in Fig. 6. The upper curves show the improved and unimproved regulations obtained on the highest speed position of the controller, and the lower curves show the improved and unimproved regulations obtained on the lowest speed position of the controller. The advantages provided by these improved regulations will be evident to those skilled in the art.

It will be observed in Fig. 6 that the regulations when the auxiliary exciter is used are practically flat throughout. However, the improvements in regulation which may thus be obtained are not limited to flat regulations on these speed positions. It is practicable to so adjust the speed regulation on the lowest speed position of the controller that the speeds at the various overhauling loads (motor M operating regeneratively) are actually lower than when hoisting various loads (motor M operating as a motor). The regulation of the full speed position of the controller can be adjusted practically for a like effect. Such adjustments may be particularly advantageous in some cases, in order that, when retarding to rest from a given speed position of the controller at the maximum rate the distance travelled during retardation, or the "drift" as it is some times called by those engaged in the practice of the art, may be as nearly equal as possible, independently of the load. When the speed regulation is quite unimproved, the "drift" will vary widely with load because, in the first place the retardation when hoisting the maximum load begins at a low speed and secondly, the retardation is assisted by the unbalanced component of the load, whereas in the case of an overhauling load the retardation begins from a considerably higher speed and is hindered by the unbalanced component of the load.

In an equipment whose regulations are improved until the speeds at various loads are equal, the "drift" may still be slightly different at different loads, because of the effect of the load in aiding or hindering the retardation. If, however, the speed regulation is adjusted for a higher speed when hoisting maximum load than when operating under a balanced load condition, the increased stored energy due to the higher speed will offset the additional retarding effort of the load which is being hoisted. Similarly with an adjustment for a lower speed when being overhauled by maximum load than when operating under a balanced load condition, the decreased stored energy due to the lower speed will offset the effect of the load in resisting the retarding forces. By the use of adjustments of the same character as explained in connection with Fig. 2, and by increasing the magnitude of the series exciter effect, the "drift" can be made more nearly equal for different conditions of loading than is the case when the regulations are adjusted for equal speeds at all loads. Thus, it will be apparent that these curves of Fig. 6 are given merely to assist in an understanding of the principles of the invention, and that the invention is not limited to an arrangement which either duplicates or substantially duplicates the curves therein shown, since as before explained, curves may be obtained as will be best adapted to the practical conditions to be met.

In using the second form of this invention, in accordance with Fig. 2, a certain incompatibility between two phenomena may be encountered if it is attempted to carry the low speed adjustments to an extreme of refinement. This limitation is liable to be encountered only in applications requiring both rapid retardation, nice control and a very slow first speed of motor M. Suppose, for example, that a very slow speed is desired on the lowest speed position of the controller and it is desired that this speed be constant from no-load to full-load or that this speed be lower when overhauled by the load than when hoisting the load. In a given case, this may require that the total generator voltage at full-load be compounded to more than double its no-load value. An auxiliary exciter adjustment, capable of this degree of compounding, will then be capable of reducing the total generator voltage at the lowest speed position to a value below zero when the exciter is excited by a regenerative load of normal maximum value; i. e., will be capable of reversing the generator voltage slightly. If motor M is retarded rapidly from full speed to the lowest speed, the excitation of the series exciter may thereby be reversed to a value so high as to saturate the series exciter and cause it to generate its maximum voltage in the reverse direction. Thus the generator field flux may be reversed to a considerabl value. Thus far, no particular difficulty is encountered, since the reversal of generator voltage thus caused will be absorbed in IR drop of the generator and motor M during the persistence of the retarding current at an overload value. However, the generator field structure is inevitably somewhat sluggish, and as the regenerative overload current dies away, the reverse flux of the generator will persist for a brief interval after the exciting cause of this reverse flux has ceased. Due to this combination of phenomena, motor M may retard to rest, or may even reverse, for an instant, after which it will recover and continue to run in the proper direction at the low speed which corresponds to the controller position. This effect, in which the motor stops or reverses momentarily when retarded rapidly to a slow speed, will hereinafter be referred to as "instability of speed when retarding to low speed."

This instability may be overcome by means of the arrangement of Fig. 3. This arrangement may be desirable where it is desired to use an extremely low speed on the first speed position, adjusted for a proportionately high degree of compounding in order to obtain a highly improved speed regulation, and when, under these adjustments, this instability of speed is quite likely to be encountered when retarding to low speed.

I would have it understood, however, that the arrangement of Fig. 2 with a proper selection of apparatus, and a careful adjustment thereof, is entirely operative and satisfactory in taking care of the ordinary conditions encountered in applying my invention to high speed elevators and other applications. For instance, the improvements in regulation of the speed-load characteristic curves as shown in Fig. 6, may readily be obtained by a proper selection of apparatus and adjustment thereof, as shown in Fig. 2, and as described heretofore. In case a very low speed is desired on the first position on the controller; that is, a speed materially lower than the low speed characteristic of Fig. 6, and if it is desired to adjust such characteristic so as to obtain uniform speed at all loads or lower speeds when over-hauling than when hoisting, the phenomena of "instability of speed when retarding to low speed" may manifest itself. Under some conditions, this phenomena may be so slight as to exert no detrimental effect in the operation of the equipment, but when the phenomena is encountered and the effect thereof is so great as to be detrimental in the operation of the equipment, the principles of the arrangement of Fig. 3 may be employed to overcome the undesirable effects of this phenomena.

As before stated, although the invention is not limited thereto, it has a particular application to the operation of elevators, either passenger or freight. In some cases it is desirable to provide a very precise speed-load characteristic, or regulation, at an extremely small fraction of full speed of the elevator, and accordingly I have arranged the control equipment for the motor driving the elevator so that the precise speed characteristic can be used conveniently by the operator. If the operator has at his command a precise and highly suitable speed characteristic at each controller position, particularly the first and the last, it will be easier for an operator having only ordinary skill to make precise landings at the floors, because of the fact that he will instinctively know the speed which will be attained at the slow speed position of the controller. This precise speed-load characteristic on the first speed position should provide a uniformity of speed, as nearly as possible over the entire range of loads, including both motor operation and regenerative operation of motor M, or in some cases preferably a characteristic in which the speed decreases with increase of overhauling load and increases with increase of load upon motor M as a motor. Thus, the operator is not required to take into account the variable load in the car, and he need exercise no special discrimination as to whether the elevator in approaching a landing, is moving in opposition to the unbalance of the load or in the direction of the unbalance. In order to take care of this condition and disclose to others the general principles involved, I have provided an arrangement as shown in Fig. 3, wherein I have illustrated one embodiment of the invention whereby any reasonably desired set of adjustments for precise regulation at an extremely low landing speed may be employed advantageously, and whereby the difficulties due to the instability of speed when retarding to low speed are obviated.

Referring to Fig. 3, it will be seen that the arrangement is in general the same as that of Fig. 2. Parts having the same function are lettered the same as similar parts in Fig. 2. Referring now to Fig. 3, it is to be observed that a set of adjustments will be made whereby the lowest or "landing" speed of motor M when operating at no-load is a very small percentage of the full-speed, probably not over 3 or 4% and conceivably even less. The auxiliary exciter E will be proportioned to the best advantage, as heretofore explained, and the resistor T will be adjusted in relation to resistor R so that, on various tests loads handled entirely at low speeds, (i. e. under conditions such that the "instability of speed when retarding to low speed" is not involved) the speed regulations will be as precise as possible at the first, or "landing" speed and at full-speed.

The apparatus thus adjusted will be likely to be somewhat unstable when retarding to low speed. This effect will be suppressed by providing automatic means to prevent the foregoing adjustments for precise speed regulation at a very low speed from being operative while the momentary overload causing this instability persists, and will be arranged so as to introduce the said adjustments into effect as wanted after the momentary overload has practically ceased.

The master control elements comprising the controller C, resistor R, resistor T, and the automatic means referred to, governing this slow landing speed, will be arranged in the manner which is found to offer the maximum of convenience. It is necessary that the slow landing speed be available at any moment, but in order to avoid waste of time, unnecessary use of this extremely low speed should be discouraged. Just what arrangement of master control element will best lend itself to this purpose in a given case depends in part upon the individual characteristics of the particular person who will be the operator of this equipment, and the preferred embodiment may be arranged to anticipate the characteristics of the average operator, as experience dictates. Two methods of arrangement of this master control element will be explained in order to give an explanation of the principles involved.

As before explained, certain parts which are necessary in practice for elevator installations have not been shown in Fig. 3, since those skilled in the art will readily supply the same.

Resistor V has been added in order to provide a very slow landing speed at no-load of motor M. It will be understood from the previous disclosure that the speed regulation of motor M on the slow-speed positions of the control equipment can be adjusted by adjustment of resistor T. In Fig. 3 I divide resistor T into three parts, $T^1$, $T^3$, and $T^4$ respectively in order to change the adjustment of the speed regulation automatically during operation.

At the off position of the controller C, the auxiliary contacts 14 and 15 are closed, so that $T^1$, as before, serves as a discharge path directly across generator field F. On the first or "landing speed" position of the controller C in either direction, resistor R, resistor V, resistors $T^1$ and $T^3$, field F and auxiliary exciter armature E are in circuit. Either contact 14 or 15 is open according as contactor 12 or contactor 13 is closed. Resistor $T^4$ is short-circuited through the upper contacts of double-throw contactor W which is energized through the contacts of rate-of-change relay RC. Resistors V, $T^1$ and $T^3$ are selected of such values that the most precise and suitable speed regulation practicable is obtained on the lowest speed position, without special regard to instability. Resistor $T^4$ is selected of a value such that on the second speed position, with all of resistor T in circuit and with resistor V short-circuited, the best speed regulation is provided, consistent with the elimination of the "instability of speed when retarding to low speed."

Contactor W is used, controlled by hand-operated contact X and by relay RC, for cutting in and out (oppositely) resistors $T^4$ and V. Contactor W is so controlled that it does not bring the slow landing speed characteristic, together with its precise regulation, into effect until desired by the operator, and not then until the conditions which give rise to the "instability of speed when retarding to low speed" have disappeared.

The "instability of speed when retarding to low speed" is due to an excessive reverse excitation of exciter E while a rapid retardation is under way, which in turn, is made possible by the low value of the field shunting resistor T relatively to the series resistors V and R. The problem is, therefore, to so control contactor W that whenever motor M is retarding rapidly, the generator field shunting resistor will be maintained at a higher value relatively to the series resistor, but when the retardation interval has nearly elapsed, the field shunting resistor T may assume its low value and the series resistors R and V a high value.

I have found that in a generator used for generator voltage control of an elevator it is usually preferable, although not absolutely necessary, to use a damping winding about the main poles of the generator in order to delay the increase and decrease of the field flux. The principal requisite for a winding of this character is that it shall have a high enough total cross-section and a short enough mean length of turn so that it allows a sufficiently high value of induced ampere-turns to be set up at the time of flux changes. A damping winding of a considerable number of turns of relatively small wire may therefore be designed which will be equally effective as one heavy turn. This damping winding is therefore available as a convenient device which is responsive to the rate-of-change of generator flux, and therefore responsive approximately to the accelerating and retarding component of the current in motor M, whereby means for controlling contactor W may be suitably actuated.

Winding L in Fig. 3, if not provided or desired for the purpose of serving as a damping means, may be a winding designed particularly to operate relay RC and have very little damping effect upon the magnetic circuit of generator C, as will be understood by those skilled in the art.

Relay RC is shown as actuated by the current induced in damping winding L on the generator field poles. It may be noted that relay RC need have only a small flux, hence it will not interpose any appreciable external inductance in the damping circuit and will therefore not interfere with the damping function of winding L. Whenever the generator field is changing rapidly, either increasing or decreasing, relay RC will lift and contactor W cannot be closed regardless of whether contact X is closed or open. When the generator field flux becomes nearly constant, the current induced in winding L decreases, and relay RC drops, whereupon contactor W is under the control of contact X. The relay RC will thus respond approximately to the rate of change of the speed of motor M and will close its contacts when the motor speed has become substantially constant.

I have stated that this master element, by which the operator obtains this slow landing speed when desired, may take different forms. It will be assumed for the present that contact X is a push button mounted in the end of the controller handle H, so located that it may be closed by a pressure of the thumb, but will not be closed by the grip of the hand about the handle H of controller C. When released, contact X returns by a spring to the open position. Between push button X and the lower conductor of excitation bus 10, the circuit will be carried through contacts on the controller, as shown, whereby the closing of push button X cannot actuate contactor W except at the lowest speed position of the controller C. Thus on the throw of the controller handle to its first speed position, the second speed, which is the lowest ordinary speed, will be obtained unless the operator presses the thumb button for the purpose of obtaining the slowest landing speed.

The operation of the invention as thus constructed and arranged is as follows:

When the thumb button is pressed and the controller C is thrown from the "off" position toward the right (with the left hand group of segments in control) to its first speed position, contactor 12 will close and the discharge contact 14 will open. The closing of the thumb button closes contact X and thereby picks up contactor W. This cuts out resistor $T^4$ and cuts in resistor V. This provides the field circuit combination for the lowest or landing speed. Under these conditions the rise of generator field flux is small, and the rate of rise is slow, so that relay RC will not lift, and will not prevent contactor W from performing its function.

Whenever the thumb button is released, so that contact X opens, while controller C continues to be held in the first speed position, contactor W drops out and the speed increases from the slow landing value to the value called for by resistors R, $T^1$, $T^3$ and $T^4$.

Whenever the controller is moved beyond its first speed position, this opens the feed circuit to contact X, and thereby drops out contactor W. Therefore, the speed increases to the value corresponding to the controller position even although contact X be held closed by the thumb button.

If the controller is moved directly from the "off" position to its second speed position or beyond, the feed to contact X is opened thereby so that contactor W cannot close, and the slow landing speed will not come into effect.

When traveling at full speed, if the operator wishes to retard the speed of the elevator, creep to a landing and stop precisely, he will, typically, retard the controller quickly to its first speed position and will simultaneously press the thumb button. The relatively high rate of decrease of generator field flux will induce a relatively high current in winding L about the pole pieces of the generator, which in turn will cause relay RC to be energized to lift. Thus, contactor W will not close immediately. As the drop-out point of relay RC is much lower than its pick-up, relay RC will thereup remain lifted until the generator field flux has decreased to nearly a steady value, whereupon the induced current in winding L will have dropped so low that relay RC will drop. Contactor W thereupon closes and reduces the speed to the creeping or landing value. Thus, during the time when the regenerative overload due to the rapid retardation might otherwise have exerted too severe a regulating effect through exciter E and resistors $T^1$ and $T^3$ upon field F, and might thus have momentarily stopped or reversed motor M, relay RC and contactor W prevent such action by retaining resistor $T^4$ also in circuit. By the time the rate of decrease of generator field flux has become small enough so that relay RC drops and allows the slow landing speed to come into action, the retarding component of the load current has nearly disappeared so that the speed will not be unstable on account of the retardation to low speed.

Contact X has been described as operated by a thumb button in the end of the controller handle, and one of the advantages of this arrangement is that the slow landing speed need never be inadvertently brought into action when not wanted. Under certain circumstances it may be desirable to omit contact X as a push button contact, and carry the actuating circuit for contactor W directly to the controller. This actuating circuit will be arranged to be effective whenever the controller is at its first speed position, (subject, of course, to the action of relay RC). The segments of the controller will then be respaced. The second speed position of the controller will keep contactor W open, and will, therefore, give the second speed. This second speed will probably be adjusted about equal to the first speed of an equipment of the usual type. The third speed position of the controller will cut out the first section of resistor R for the third speed, and similarly the remaining sections of the resistor will be cut out successively on further movement of the controller.

It is possible to substitute other means in place of relay RC or in place of relay RC and contactor W. For example, the case may arise in which the desired characteristics in other respects can best be obtained by eliminating all extra damping devices from the generator field poles and allowing the rate of decrease of the generator field current to be limited only by its own proportions and by the discharge path through contacts 14 and 15 and resistor $T^1$. Winding L is then not available for operating relay RC unless provided specially in the form of a small-capacity auxiliary coil for this express purpose. A different form of relay can be used as a substitute for relay RC, in accordance with the method shown in Fig. 4.

Fig. 4 is intended to be merely a detail, to be considered in connection with Fig. 3. In Fig. 4, a two-coil relay RC' is shown whose coils act upon the same magnetic circuit and which normally oppose each other. One coil is energized by the current of generator field F and the other coil is energized by the voltage across field F. The coils will be designed so that at any constant value of field current, the two coils are of equal strength in ampere-turns and their combined effect is zero. While the generator field strength is changing at a noticeable rate, the voltage appearing at the terminals of field winding F is not proportional to the current in F, but is greater or less by reason of the self-induced voltage of the field. Thus while the field strength is changing, the combined effect of the two coils of the relay RC' in Fig. 4 will not be zero and the relay will lift. This relay can therefore be used for the same purpose as relay RC in Fig. 3.

Still other devices may be provided, operating on the same general principle of the rate of change of a changing condition of the equipment, to accomplish the same purpose as relay R in Fig. 3.

As will be understood by those skilled in the art, from a consideration of the foregoing, it is possible to obtain the desired effect, as provided in Fig. 3 by relay RC, by means of devices whose actuation is obtained in accordance with other principles associated with the retardation of motor M; for example, a device which will respond directly to the rate of change of the armature current of motor M may be used to prevent automatically the effectiveness of the adjustments for the slow landing speed during the time when the armature current is changing at any considerable rate, or a mechanical inertia device which is driven flexibly by motor M may be provided for actuating contacts according as its mechanical phase position is in or out of correspondence with that of motor M; these contacts can then be used for the same purpose as the contacts of relay R in Fig. 3.

It has been shown that for the most preferred degree of regulation there is required such a modulation of the compounding that when the controller is shifted from the full-speed to the lowest speed position, the compounding will become absolutely less but proportionately greater. It has been shown also how this characteristic is provided by the arrangement of Fig. 2.

In Fig. 5 I have disclosed an arrangement for the same purpose as the arrangement of Fig. 2 and this figure, like Fig. 4, is intended to be merely a detail showing only so much as is necessary for an understanding of the modification, when considered in connection with Fig. 2. In Fig. 2 I have disclosed an arrangement in which the excitation of the generator is supplied entirely through its field winding F and in which the proportionately greater effect of exciter E at low speed positions of the controller is obtained by the use of resistor T as described hereinbefore. It is not necessary that this proportionately greater effect be obtained by the use of resistor T nor that the entire excitation of the generator be supplied by a single field F, and I have, therefore, shown in Fig. 5 a separately excited auxiliary field winding $F^2$, which may be placed upon the same pole pieces which carry winding F and which is arranged to be connected directly across the armature of exciter E when either the contactor 12 or the contactor 13 closes. This auxiliary field will be connected and disconnected through the auxiliary contacts 16 and 17 of the contactors 12 and 13. The parts which have the same function as similar parts in Fig. 2 are designated by the same reference characters. In general, the exciter E in Fig. 5 will be designed for a less voltage and greater armature current capacity than in the case of Fig. 2, because of the fact that it exerts its effect upon two windings F and $F^2$ instead of upon a single winding F. The operation of this arrangement is in general as follows:

When the controller is moved so as to close either the contactor 12 or the contactor 13, the field discharge connection through the resistor $T^1$ is opened at either the auxiliary contact 14 or the auxiliary contact 15, depending upon whether contactor 12 or the contactor 13 is energized to close. Assume that contactor 12 has been energized to close, the auxiliary generator field $F^2$ will be connected in shunt to the armature of the exciter E through the auxiliary switch 16 associated with contactor 12. When the controller C (Fig. 2) has been moved to the full speed position, resistor R being short-circuited, exciter E (Fig. 5) exerts its compounding effect in two ways: first, by boosting or bucking the current in field winding F, which current is determined largely by excitation bus 10; secondly, by energizing winding $F^2$, the current in which is determined, both in direction and in magnitude, solely by exciter E.

When the controller C (Fig. 2) is moved from the full-speed position to the lowest speed position, that part of the compounding characteristic in ampere-turns per unit of load which is applied through winding F is reduced by the effect of resistor R (Fig. 2), and remains proportional to the no-load ampere-turns of winding F. The other part of the compounding characteristic ampere-turns per unit of load, namely that part which is applied through winding $F^2$ is unaffected by resistor R and is the same, in actual ampere turns per unit of load, at the lowest speed position of the controller as at the highest, and is therefore greater at the lowest speed position in proportion to the no-load ampere-turns. It follows therefore that the total compounding effect at the lowest speed position of the controller is less in actual ampere-turns per unit of load than at full speed but greater in proportion to the no-load ampere-turns.

By the proper proportioning of windings

F and F² and exciter E, the desired compoundings can be obtained from no-load to normal load of motor M at the full speed position and at the lowest speed position of the controller. The resistor shown in series with winding F² makes it possible to adjust the compounding at the lowest speed, with comparatively little disturbance of the compounding adjustment at full speed, on account of the higher degree of saturation of the generator at the full speed position of the controller.

What I claim as new and desire to secure by Letters Patent of the United States is:—

1. The combination with a separately excited motor and a separately excited generator having its armature connected to supply the armature current of said motor, of an exciter having a magnetic structure provided with a magnetizing winding connected to be energized in accordance with the current in the armature circuit of said motor and an armature connected to regulate a component of the separate excitation of said generator substantially in accordance with the armature current of said motor until a predetermined value of motor armature current is reached at which the magnetic structure of said exciter becomes substantially saturated, and then maintain the said component at a substantially constant value for further increased values of the motor armature current by reason of the degree of saturation of said magnetic structure.

2. The combination with a separately excited motor and a generator having its armature connected to supply the current for the armature of said motor, the said generator having a field winding arranged to be separately excited from a substantially constant potential source of supply, of an exciter connected in series relation with the said field winding and constructed to generate a potential varying substantially directly in accordance with the current supplied to said motor by said generator up to a predetermined maximum which is less than the potential of said constant potential source and then to generate a substantially constant potential for further increases of the current supplied by said generator to said motor.

3. The combination with a separately excited motor and a generator for supplying the armature current of said motor, a separately excited field winding for said generator arranged to be connected to a substantially constant potential source of supply, and an exciter having a field winding energized responsively to the armature current of said motor and having its armature connected in series relation with the said generator field winding, the said exciter having a magnetic structure whereby the exciter generates a voltage which increases substantially in accordance with the armature current of said motor until the exciter reaches a maximum voltage of a predetermined percentage of the voltage of said constant potential source of supply and then remains at a substantially constant voltage for further increases of said armature current.

4. In combination, a separately excited generator and a separately excited motor having its armature in a local circuit with the generator armature, and an auxiliary dynamo electric machine provided with an exciting member connected to be energized in accordance with the load current exchanged between said generator and motor armatures for regulating the value of the potential at the armature terminals of said motor to compensate for the tendency of the speed of the motor to vary as the load varies, the said exciting member being proportioned to cause said compensation effect to vary with said load current throughout a predetermined range of values thereof and to become saturated at a predetermined value of the current in said local circuit to prevent further regulation of the voltage at the armature terminals of said motor at load values beyond said range, and a controller which regulates the effect of said auxiliary machine in determining the voltage at the armature terminals of said motor.

5. In combination, a generator having a field winding arranged to be separately excited from a separate source of supply and a separately excited motor having its armature in a local circuit with the generator armature, an auxiliary dynamo electric machine provided with an exciting member connected to be energized in accordance with the load current exchanged between said generator and motor armatures for regulating the value of the potential at the armature terminals of said motor to compensate throughout a predetermined range of load values for the inherent tendency of the speed of the motor to droop as the load increases, the said exciting member being proportioned to become saturated above a predetermined value of the current in said local circuit to limit the effect of said machine in regulating the voltage at the armature terminals of said motor beyond said predetermined value and thereby prevent further compensation for said tendency for motor load values beyond said predetermined range, and a controller connected with said generator field winding to regulate the no load energization of said generator field winding and the effect of said auxiliary machine in determining the voltage at the armature terminals of said motor.

6. In combination, a separately excited dynamo electric machine adapted for both generating and motoring operation, a controller for determining the direction of the excitation of said dynamo electric machine and for varying the excitation of said machine in each direction between a plurality of values, and an exciter having an armature connected to cooperate with said controller so as to increase the excitation of said dynamo electric machine during generating operation, and to decrease the excitation of said dynamo electric machine during motoring operation, said exciter having a field winding connected in circuit with the armature of said dynamo electric machine whereby said exciter varies the excitation of said dynamo electric machine substantially in accordance with the armature current of said dynamo electric machine, and means responsive to said armature current for limiting the effect of said exciter upon the excitation of said dynamo electric machine.

7. In combination, a generator having a field winding arranged to be separately excited from a substantially constant potential source of supply, a separately excited motor having its armature connected in a local circuit with the armature of said generator, a controller having a plurality of definite positions for regulating the said separately excited field winding of the generator to determine the no-load speeds of said motor, and an exciter having an armature connected with said generator field winding to regulate a component of the separate excitation of said generator field winding, said exciter having a field winding connected in said local circuit whereby said exciter regulates said component in accordance with the current in said local circuit to cause the speed of said motor under load at certain of the definite positions of the controller to be substantially the same throughout the normal range of loads of said motor as the no-load speeds determined by the controller, and means excited by the current in said local circuit for limiting to a predetermined value the effect of said exciter on said separately excited generator field winding.

8. The combination with a separately excited motor and a generator having its armature connected to supply the armature current of said motor, of a field winding for said generator arranged to be separately excited from a substantially constant potential source of supply, means for varying a component of the separate excitation of said generator substantially in accordance with variations of the armature current of said motor to compensate throughout a predetermined range of load values for the inherent tendency of the speed of the motor to vary under load, and rheostatic controlling means interconnected with said generator field winding and said first mentioned means for varying the no-load voltage of said generator and the proportionate effect of said first mentioned means on the voltage of said generator under load conditions.

9. The combination with a separately excited motor and a generator having its armature connected to supply the current for the armature of said motor, the said generator having a field winding arranged to be separately excited from a substantially constant potential source of supply, an exciter connected to be excited responsively to the armature current of said motor and having its armature connected in series relation with the said field winding for regulating the excitation of said generator, and a rheostat included in the circuit of said exciter armature and said generator field winding for regulating the no-load voltage of said generator and the proportionate effect of the said exciter in determining the voltage of the generator under load.

10. The combination with a dynamo electric machine having a field winding arranged to be separately excited from a substantially constant potential source of supply, of means for varying a component of the separate excitation of said machine substantially in accordance with variations of the armature current of said machine, and means comprising a rheostat electrically connected with the said field winding and said first mentioned means for varying the no-load excitation of said machine and for causing the said first mentioned means to have a proportionately greater effect on the excitation of said machine under load for predetermined adjustments of the said rheostat.

11. In combination, a dynamo electric machine having a field winding arranged to be separately excited from a substantially constant potential source of supply, of means for varying a component of the separate excitation of said machine substantially in accordance with variations in the armature current of said machine, an adjustable controller for determining the no load excitation of said machine, and means cooperating with said first mentioned means in response to the adjustment of said controller for varying the effect of said first mentioned means on the excitation of said machine under load.

12. The combination with a dynamo electric machine having a field winding arranged to be separately excited from a substantially constant potential source of supply, of means for varying a component of the separate excitation of said machine substantially directly in accordance with variations of the armature current of said machine, a rheostat electrically connected with the said field winding for regulating the no-load generated voltage of said machine, and means cooperating with said first mentioned means in response to the adjustment of said rheostat for increasing the effect of said first mentioned means on the voltage of said machine under load.

13. The combination with a dynamo electric machine having a field winding arranged to be separately excited from a substantially constant potential source of supply, of an exciter for varying a component of the separate excitation of said machine between predetermined limits substantially in accordance with variations of the current in the armature circuit of said machine, a rheostat electrically connected with the said field winding for determining the maximum and minimum no-load generated voltages of said machine, and means cooperating with said rheostat and said exciter for increasing the effect of said exciter when said rheostat is adjusted to give a low no-load voltage.

14. The combination with a dynamo-electric machine having a field winding arranged to be separately excited, of an exciter for said field winding responsive to variations in the armature current of said dynamo-electric machine, a rheostat for varying the excitation of said field winding and a resistance electrically connected with said exciter so as to vary the effect of said exciter in accordance with the adjustment of said rheostat.

15. The combination with a dynamo electric machine having a field winding arranged to be separately excited from a substantially constant potential source of supply, of an exciter for varying a component of the separate excitation of said machine between predetermined limits substantially directly in accordance with variations of the armature current of said machine, a rheostat electrically connected with said field winding for regulating the no-load excitation of said machine, and a resistance electrically connected with the said exciter for increasing the effect of said exciter in determining the excitation of said machine under load when the said rheostat is adjusted for a predetermined no-load excitation.

16. The combination with a dynamo electric machine having a field winding arranged to be separately excited from a substantially constant potential source of supply, of an exciter for varying a component of the separate excitation of said machine between predetermined limits substantially directly in accordance with variations of the armature current of said machine, resistance for regulating the energization of the said field winding, and a potentiometer connection of the said resistance, the said exciter and the said field winding for regulating the effect of the said exciter in determining the voltage of said machine under load.

17. The combination with a dynamo electric machine having a field winding arranged to be separately excited from a substantially constant potential source of supply, of an exciter connected to be excited responsively to the armature current of said machine and having its armature in series relation with the said field winding, an adjustable rheostat for determining the no-load excitation of said machine, and a resistor shunting the circuit including the said exciter armature and the said field winding for increasing the effect of said exciter in determining the excitation of said machine under load when the said rheostat is adjusted for a predetermined no-load excitation.

18. In combination, a generator having a field winding arranged to be separately excited from a substantially constant potential source of supply, an exciter having a field winding included in the armature circuit of said generator and having an armature included in series relation with the said generator field winding, a resistor shunting the circuit including said exciter armature and said generator field winding, and an adjustable rheostat included in series relation with the circuit including the said exciter armature and said generator field winding with the said resistor in shunt thereto.

19. In combination, a generator having a field winding arranged to be separately excited from a substantially constant potential source of supply, a separately excited motor having its armature included in a local circuit with the armature of said generator, an exciter having a field winding included in the said local circuit and an armature connected in series relation with the field winding of said generator to regulate a component of the separate excitation of the generator, an adjustable rheostat included in series relation with the said exciter armature and said generator field winding for determining the maximum and minimum no load speeds of said motor, and a resistor connected in multiple relation with the said exciter armature and said generator field winding for causing the said exciter to have a proportionately greater effect in determining the speed of said motor under load when the said rheostat is adjusted for a comparatively low no load speed of the motor.

20. In combination, a dynamo electric machine having a main field winding arranged to be separately excited from a substantially constant potential source of supply, an exciter having a field winding energized responsively to the current in the armature circuit of said machine and an armature included in series relation with the said main field winding to regulate a component of the separate excitation of said machine, and an auxiliary field winding for said machine connected to be supplied with current from said exciter armature for increasing the effect of said exciter in determining the excitation of said machine under load.

21. The combination with a dynamo electric machine having a field winding arranged to be separately excited from a substantially constant potential source of supply, of an exciter having its armature in series relation with the said field winding for automatically regulating a component of the separate excitation of said machine, a controller for governing the connection of said field winding to the said constant potential source of supply, and means whereby the said field winding is connected in a local discharge circuit and the regulating effect of the said exciter upon the field winding is discontinued when the controller is operated to disconnect the field winding from the said source of supply.

22. The combination with a dynamo electric machine having a field winding arranged to be separately excited from a substantially constant potential source of supply, of an exciter having its armature in series relation with the field winding for automatically regulating a component of the separate excitation of said machine, resistance for determining the no load generated voltage of said machine and for increasing the proportional effect of said exciter in determining the voltage of said machine under load when the said resistance is adjusted for a comparatively low no-load voltage, a controller for regulating the said resistance and for controlling the connection of said field winding and the armature of said exciter to the said source of supply, and connections whereby the said field winding is connected in a local discharge path which includes a portion of the said resistance and excludes the armature of said exciter when the said controller is operated to disconnect the said field winding from the said source of supply.

23. In combination, two separately excited dynamo electric machines, the first of which normally serves as a generator supplying the armature current for the second machine and causes the second machine to operate as a motor, means for varying the field current of one of said machines to regulate the speed of the machine operating as a motor, and means set into operation in response to a rapid variation of the said field current for preventing instability of the speed of said motor.

24. In combination, two separately excited dynamo electric machines, the first of which normally serves as a generator supplying the armature current for the second machine and causes the second machine to operate as a motor, means for varying the field current of one of said machines to regulate the speed of the machine operating as a motor, and an electroresponsive device having a winding connected with one of said machines to be automatically operated thereby in response to conditions which would set up a tendency to produce instability of the speed of said motor during motor speed retardation for governing one of said machines to counteract the said tendency.

25. In combination, two separately excited dynamo electric machines, the first of which normally serves as a generator supplying the armature current for the second machine to cause the second machine to operate as a motor, an auxiliary dynamo electric machine connected to respond to the armature current of said motor for regulating the potential at the armature terminals of said motor, a controller for varying the separate excitation of said generator and the proportionate effect of the said auxiliary machine in determining the potential at the armature terminals of said motor, and electroresponsive means interconnected with one of said machines and set into operation in response to a rapid manipulation of said controller for controlling one of said machines to counteract a tendency toward instability of the speed of said motor.

26. The combination with two separately excited dynamo electric machines, the first of which serves as a generator supplying the armature current for the second machine to cause the second machine to operate as a motor, electroresponsive means operated responsively to the rate of change of the field flux of the first of said machines for regulating the excitation of one of said machines to prevent instability of the speed of said motor when the excitation of said generator is quickly varied to quickly vary the speed of the motor.

27. The combination with two separately excited dynamo electric machines, the first of which serves as a generator supplying the armature current for the second machine to cause the second machine to operate as a motor, of resistance in the field circuit of one of said machines for regulating the value of the excitation of the machine, and electromagnetic switch mechanism connected to be energized to operate responsively to the rate of change of the field flux of the first of said machines for regulating the said resistance to prevent instability of the speed of said motor when the excitation of said generator is quickly varied to quickly vary the motor speed.

28. The combination with a dynamo electric machine having a separately excited field winding, of means for varying the energization of the said field winding responsively to the armature current of said machine, and means operated responsively to the rate of change of an operating condition of said machine for automatically controlling the energization of said field winding.

29. The combination with a dynamo electric machine having a field winding arranged to be separately excited from a substantially constant potential source of supply, of an exciter excited responsively to the armature current of said machine for regulating the energization of said field winding, and means operated responsively to the rate of change of an operating condition of said machine for automatically regulating the value of the energization of said field winding by said exciter.

30. The combination with a generator having a separately excited field winding and a motor having its armature connected to be energized from the armature of said generator, of means for varying the energization of said field winding to vary the speed of said motor, and means energized responsively to the rate of change of the speed of said motor for controlling the energization of said field winding.

31. The combination with a generator having a field winding arranged to be separately excited from a substantially constant potential source of supply and a motor having its armature connected to be energized from the armature of said generator, of an exciter connected to be excited in accordance with the current exchanged between the said motor and generator for automatically increasing the energization of said field winding as the current taken by said motor increases and automatically decreasing the energization of said generator field winding when the said motor operates as a generator, and means automatically operated responsively to the rate of change of the energization of said generator field winding for preventing said exciter from causing such a value of current to pass in the reverse direction through the said field winding when the energization of said generator field winding is decreased and the said motor operates as a generator as to cause an unintentional detrimental tendency of the said motor to reverse momentarily.

32. The combination with a generator having a field winding arranged to be separately excited from a substantially constant potential source of supply and a motor having its armature connected to be energized from the armature of said generator, of an exciter for automatically varying the energization of said field winding in accordance with the exchange of curernt between said generator and said motor, a controller for varying the energization of said field winding to determine the no-load voltage of said generator, and means for automatically preventing said exciter from causing such a value of current to pass in the reverse direction through the said field winding when the said controller is operated as to cause an unintentional detrimental tendency of said motor to reverse momentarily.

33. The combination with a generator having a field winding arranged to be separately excited from a substantially constant potential source of supply and a separately excited motor having its armature connected to be energized from the armature of said generator, of an exciter for automatically varying the energization of said field winding in accordance with the exchange of current between said generator and said motor, adjustable resistance electrically connected with the said field winding for determining the maximum and minimum no load generated voltages of said generator and for causing the said exciter to have a proportionately greater effect in determining the voltage of said generator under load when the said resistance is adjusted for a comparatively low no-load voltage, and means energized responsively to the rate of change of the excitation of said generator for preventing the said proportionately greater effect of the exciter from being fully operative while the operating conditions of the said motor are changing rapidly in response to a rapid re-adjustment of the said resistance.

34. The combination with a dynamo electric machine having a field winding arranged to be separately excited from a substantially constant potential source of supply, of an exciter for varying the separate excitation of said machine between predetermined limits substantially directly in accordance with variations of the armature current of said machine, resistance for regulating the energization of the said field winding, a potentiometer connection of the said resistance, the said exciter and the said field winding for increasing the effect of said exciter in determining the voltage of said machine under load when the excitation of the said field winding is adjusted to give a comparatively low no-load voltage of said generator, and switch mechanism energized responsively to the rate of change of the flux of said generator for controlling the said resistance to prevent the said proportionately greater effect of the exciter from being fully operative while the operating conditions of the said motor are changing rapidly in response to a rapid readjustment of the said resistance.

35. The combination with a dynamo electric machine having a field winding arranged to be separately excited from a substantially constant potential source of supply and a separately excited motor having its armature connected to be energized from the said generator, of an exciter having its armature connected in a circuit in series relation with the said field winding and connected to be energized responsively to the exchange of current between the armatures of said generator and said motor, an adjustable rheostat for determining the no-load generated voltage of said generator, resistance shunting the said circuit including the said exciter armature and the said field winding for increasing the effect of said exciter in determining the voltage of said generator when the said rheostat is adjusted for a low no-load voltage of said generator, and switch mechanism energized responsively to the rate of change of the flux of said generator for preventing the said proportionately greater effect of the exciter from being fully operative while the operating conditions of the said motor are changing rapidly in response to a rapid re-adjustment of the said resistance.

36. The combination with a Leonard system of automatic electroresponsive means interconnected with the system for varying the voltage applied to the armature of the motor to provide for the tendency of the speed of the motor to vary as the load varies, a compensation which varies substantially directly with the load within a predetermined range of load values, the said means being characterized by the provision of a winding connected to be energized responsively to the motor armature current and means energized by said winding for governing the energizing effect of said winding so that said compensation is substantially without change for load values beyond said range.

37. The combination with a Leonard system of automatic means interconnected with the system for regulating the voltage of the generator to cause said voltage to increase proportionately as the load on the motor increases and thereby compensate throughout a predetermined range of load values for the tendency of the speed of the motor to droop as the load is increased, the said means including a winding energized responsively to the motor armature current and means energized by said winding arranged to regulate the energizing effect of said winding so as to vary said generator voltage in proportion to the load on the motor throughout said predetermined range of motor load values but to provide no further change in generator voltage for load values beyond said range.

38. The combination with a Leonard system of an auxiliary dynamo electric machine interconnected with the system for regulating the voltage applied to the motor armature to compensate throughout a predetermined range of load values for the tendency of the speed of the motor to vary as the load varies, the said machine being provided with an exciting winding energized responsively to the motor armature current and a field magnet structure excited thereby and proportioned to become saturated in response to a predetermined armature current so as to thereby regulate the effect of said winding and cause the voltage of said machine to vary substantially directly in accordance with the load on the motor throughout said range and prevent further variation of the voltage of said machine for load values beyond said range.

39. The combination with a Leonard system of an exciter having an armature connected with a field winding of the generator to regulate a component of the generator excitation to compensate for the tendency of the speed of the motor to vary as the load varies, the said exciter having a field winding connected with the generator to be energized in accordance with the generator armature current and a field magnet structure excited thereby and proportioned to limit the effect of said winding by reason of its saturation characteristics whereby the flux set up therein by said exciter field winding varies in value substantially directly with the said generator armature current up to a predetermined value thereof and then varies substantaially no further in response to an increase of said generator armature current beyond said value.

40. In combination, a Ward Leonard system including a separately excited generator and a motor supplied thereby, a controller for varying the energization of the separately excited field winding of said generator, a control device responsive to the rate of change of the field produced in said generator by said winding, and means governed by said control device for stabilizing the operation of said motor.

41. In combination, a Ward Leonard system including a separately excited generator and a motor supplied thereby, a controller for varying the energization of the separately excited field winding of said generator, a winding inductively related to the magnetic field set up by said field winding, an electromagnetic switch controlled by said inductively related winding, and a resistor connected with one of said windings controlled by said electromagnetic switch.

In witness whereof I have hereunto set my hand this 2nd day of April, 1924.

MAX A. WHITING.